United States Patent [19]
Hulsebosch

[11] Patent Number: 6,049,453
[45] Date of Patent: Apr. 11, 2000

[54] PERSONAL DIGITAL ASSISTANT AND ASSOCIATED COMPUTER HOST DEVICE BAY STRUCTURE

[75] Inventor: David A. Hulsebosch, Spring, Tex.

[73] Assignee: Compaq Computer Corporation, Houston, Tex.

[21] Appl. No.: 08/987,624

[22] Filed: Dec. 9, 1997

[51] Int. Cl.$^7$ ........................................ G06F 1/16
[52] U.S. Cl. ................ 361/686; 361/816; 361/818
[58] Field of Search ................... 361/680, 683, 361/685, 816, 818; 364/708.1; 395/281–283

[56] References Cited

U.S. PATENT DOCUMENTS

| | | | |
|---|---|---|---|
| 5,477,421 | 12/1995 | Bethurum | 361/818 |
| 5,537,343 | 7/1996 | Kikinis et al. | 361/686 |
| 5,600,800 | 2/1997 | Kikinis et al. | 395/281 |
| 5,673,172 | 9/1997 | Hastings et al. | 361/685 |
| 5,689,654 | 11/1997 | Kikinis et al. | 361/686 |
| 5,822,546 | 10/1998 | George | 395/281 |
| 5,838,542 | 11/1998 | Nelson et al. | 361/818 |

*Primary Examiner*—Leo P. Picard
*Assistant Examiner*—Lisa Lea Edmonds
*Attorney, Agent, or Firm*—Konneker & Smith, P.C.

[57] ABSTRACT

The base housing of a notebook computer is provided with an EMI-shielded internal bay structure which is configured to removably receive a personal digital assistant (PDA) in a manner mating an electrical connector on the PDA with a corresponding electrical connector within the bay structure. The mating of the two connectors couples a battery charging circuit within the host computer device with a storage battery in the PDA, and also couples a data storage device within the host computer device with a data storage memory area within the PDA. Accordingly, the PDA battery may be charged, and data transferred from the PDA to the host computer device without the previous necessity of using a dedicated external PDA stand and associated separate data transfer and battery charging cabling. In an alternate embodiment of the invention, the PDA is inserted into an EMI-shielded multibay adapter structure which in turn is inserted into a bay within the host computer device to couple the PDA and host computer device electrical connectors.

5 Claims, 2 Drawing Sheets

PERSONAL DIGITAL ASSISTANT AND ASSOCIATED COMPUTER HOST DEVICE BAY STRUCTURE

BACKGROUND OF THE INVENTION

1. Field of the Invention

The present invention generally relates to computer apparatus and, in a preferred embodiment thereof, more particularly relates to apparatus for connecting a personal digital assistant (PDA) to a host computer device, such as a desktop computer, a portable computer or a computer docking station, for the purposes of data exchange therebetween and electrical charging of the PDA.

2. Description of Related Art

A personal digital assistant (PDA) is a small computer-like device which typically has a base housing with a miniature keyboard mounted on its top side, and a hinged display screen housing pivotal between a closed position in which it extends across and covers the keyboard, and an open position in which it is pivoted to a generally upright position to expose the keyboard and a display screen which faces the user of the device. A small microprocessor, a data storage memory area, and a storage battery are typically mounted within the base housing along with various other miniature electronic components.

Conventional PDA's are also typically provided with an operating system and pre-loaded programs, such as word processing, spreadsheet and other programs, which are abbreviated versions of their larger computer counterparts. The increasing popularity of PDA's stems from both their relatively low cost and extreme portability compared to, for example, much larger notebook computers. Many users find that for simple computing tasks during trips and other periods of being away from their larger computer devices the bulk and computing power of even a compact notebook computer are simply not needed.

However, for extended use periods and more complex computing tasks it is recognized that larger computer devices, such as notebook and desktop computers, are considerably more suitable than the diminutive PDA device. Accordingly, when a user's trip is completed he typically transfers the work data from the PDA to his larger computer device, to take advantage of its more comfortable size and increased power and speed, and recharges the PDA's battery.

As currently accomplished, these PDA data transfer and battery recharging tasks tend to be rather awkward and inconvenient. Specifically, such tasks currently require a dedicated PDA stand which the PDA must be supported on and plugged into, with separate data transfer and charging cables. The data transfer cable must be extended from the stand to a host computer device such as a desktop computer unit, a tower computer unit, a portable computer or a computer docking station, for data transfer purposes, and the other cable must be extended to a source of electrical recharging power.

These two cables, and the PDA stand, add considerable weight and bulk to the overall PDA package which must be carried around, and the cables tend to be rather clumsy to use. Additionally, if either the cables or the stand are lost or misplaced, the desired PDA data transfer and recharging cannot be carried out. Further, EMI/RFI suppression for the PDA must be incorporated into the data transfer cable, a requirement which adds considerably to its cost.

As an alternative to this cable-based data transfer from the PDA to a host computer device, various proposals have been made to effect such data transfer by an infrared beam system. However, this data transfer technique inconveniently requires an unobstructed and aligned field of vision for the PDA IR data link to be established with the host computer device.

As can readily be seen from the foregoing, a need exists for improved apparatus for recharging a PDA device and enabling data transfer between the PDA and a host computer device. It is to this need which the present invention is directed.

SUMMARY OF THE INVENTION

In carrying out principles of the present invention, in accordance with a preferred embodiment thereof, computer apparatus is provided which includes a personal digital assistant device (PDA), a host computer device, and a specially designed bay structure.

The personal digital assistant device has an internal memory area for receiving data, a structure for holding a rechargeable storage battery, and a first electrical connector coupled to the memory area and the battery holding structure. The host computer device, which may be a portable computer, a desktop computer unit, a tower computer unit, or a computer docking station, has disposed therein a data storage device, battery charging circuitry, and a second electrical connector coupled to the data storage device and the battery charging circuitry.

The bay structure is operative to facilitate insertion of the personal digital assistant device into the host computer device in a manner removably mating the first and second electrical connectors to operatively couple the battery charging circuitry to a storage battery carried by the holding structure, and to permit data transfer between the PDA memory area and the host computer device data storage device. Thus, by simply inserting the PDA into the bay structure of the host computer device, data transfer between the PDA and the host computer device, and charging of the PDA battery, may be effected without the previous requirement for (1) an external PDA stand structure, (2) a data transfer cable, and (3) a battery charging cable.

In one embodiment thereof the bay structure is a dedicated PDA bay disposed within the host computer device and includes a bay housing having an open outer end for receiving the personal digital assistant device, an inner end supporting the second electrical connector, and an interior surface covered by an EMI shielding material grounded to a portion of the host computer device. Cooperating electrostatic discharge structures are disposed on the EMI shielding material and the personal digital assistant device and are engageable, during insertion of the personal digital assistant device into the bay housing, prior to the mating of the first and second electrical connectors.

In an alternative embodiment thereof the bay structure includes a bay housing disposed in the host computer device and having an open outer end, and an inner end supporting the second electrical connector, and a multibay adapter. The multibay adapter carries a third electrical connector structure which is mateable with the the first and second electrical connectors, the multibay adapter having a housing portion into which the personal digital assistant device is inserted to mate the first electrical connector with the third electrical connector structure. The housing portion of the multibay adapter has an interior surface covered with an EMI shielding material.

Cooperating electrostatic discharge structures are disposed on the EMI shielding material and the personal digital assistant device and are engageable, during insertion of the personal digital assistant device into the housing portion of the multibay adapter, prior to the mating of the first electrical connector with the third electrical connector structure.

DETAILED DESCRIPTION

Figure 1:
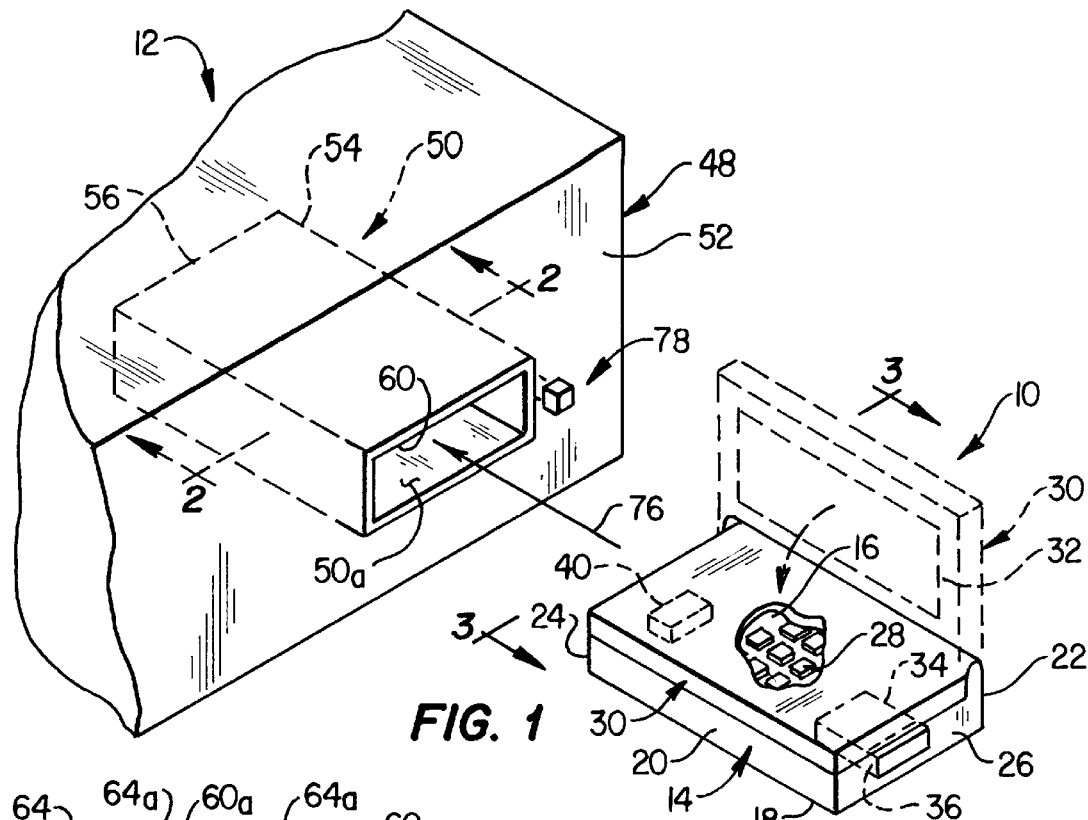
FIG. 1 is a simplified schematic perspective view of a personal digital assistant (PDA) which is insertable into a bay structure within a host computer device to effect data transfer between the PDA and the host computer device, and to charge a storage battery within the PDA.
Figure 3:
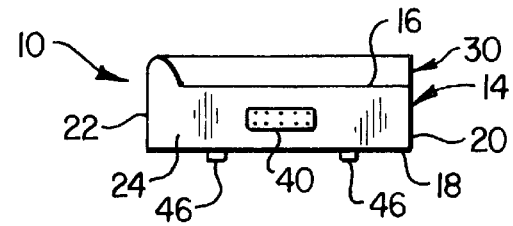
FIG. 3 is a simplified schematic end view of the PDA taken generally along line 3—3 of FIG. 1.
Figure 4:
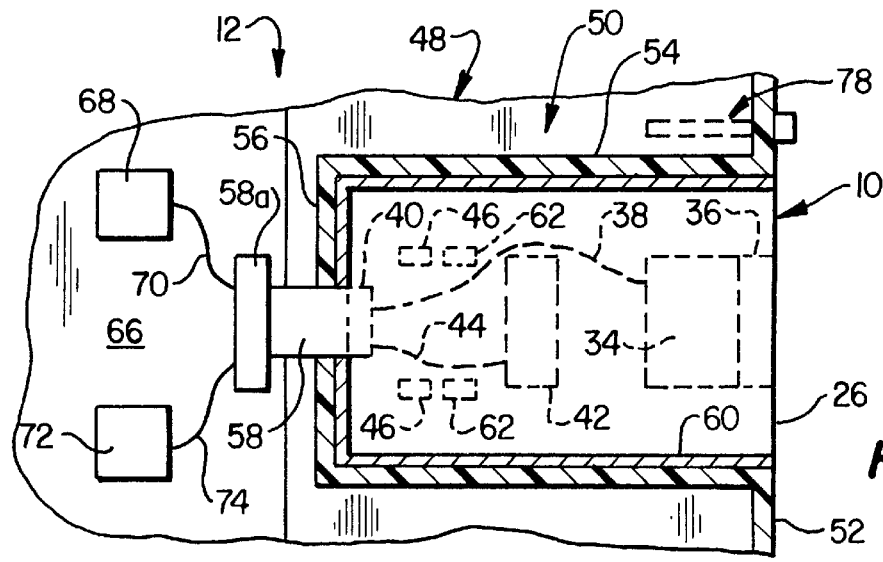
FIG. 4 is an enlarged scale schematic cross-sectional view through the bay structure, with the PDA operatively inserted therein, taken generally along line 4—4 of FIG. 2.

Illustrated in simplified, somewhat schematic form in FIGS. 1, 3 and 4 are a personal digital assistant device (PDA) 10 and a host computer device 12 which embody principles of the present invention. The PDA 10 has a generally rectangular base housing 14 with top and bottom sides 16 and 18, front and rear sides 20 and 22, left and right ends 24 and 26, and a keyboard 28 mounted on the top side 16. A somewhat thinner lid housing 30 is hingedly secured to a top rear corner portion of the base housing 14 for pivotal movement relative thereto between a solid line closed position illustrated in FIGS. 1 and 3, in which the lid housing 30 extends across and covers the top base housing side, and a dotted line open position (see FIG. 1) in which the lid housing 30 is in generally upright position to expose the keyboard 28 and position a display screen 32 carried on the lid housing to face the user of the PDA 10.

A rechargeable storage battery 34 is supported within the base housing 14 in a battery holder structure 36 (see FIG. 4) which is connected via a suitable charging lead 38 to an electrical connector 40 carried on the left end 24 of the base housing 14. Holder structure 36 is operative to receive electrical charging energy transmitted thereto through the lead 38 and transfer the received charging energy to the battery 34. Also disposed within the base housing 14 is a data storage memory area 42 which is adapted to store data generated by the PDA 10 via one or more software programs loaded into it. The memory storage area 42 is coupled to the electrical connector 40 via a data transfer lead 44.

For purposes later described herein, the base housing 14 has a spaced pair of downwardly projecting electrostatic discharge (ESD) pads 46 on its bottom side 18 near its left end 24. Representatively, these ESD pads 46 are formed from short sections of metal leaf spring elements.

The host computer device 12 is representatively a notebook computer having a base housing 48, a portion of which is shown in FIG. 1. Alternatively, the host computer device could be a desktop computer unit, a tower computer unit, or a computer docking station. A specially designed PDA bay structure 50, having an open outer end 50a, extends into the interior of the base housing 48 through an exterior wall 52 thereof. Bay structure 50 includes a rectangularly cross-sectioned plastic bay housing 54 extending inwardly from the open outer bay end 50a and having a rear wall 56 through which an electrical connector 58 inwardly extends, the connector 58 being removably mateable with the PDA connector 40.

Figure 2:
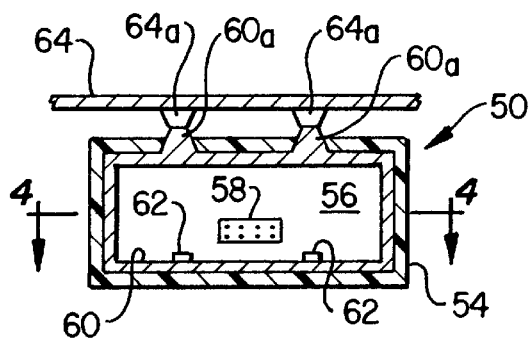
FIG. 2 is a simplified schematic cross-sectional view through the bay structure taken generally along line 2—2 of FIG. 1.

The interior surface of the bay housing 54 is covered with a metallic EMI shielding material 60, and a spaced pair of ESD pads 62 project upwardly from the bottom side of the EMI shielding material 60. Additionally, as shown in FIG. 2, the EMI shield 60 is grounded to an adjacent metal chassis portion 64 within the base housing 48 by means of a pair of grounding projections 60a extending upwardly through the top side of the plastic bay housing 54 and contacting corresponding grounding projections 64a on the chassis portion 64.

The electrical connector 58 has a body portion 58a (see FIG. 4) which is secured to a side of a motherboard 66 disposed behind the bay structure 50. Conventional electrical charging circuitry 68 is disposed within the base housing 48, receives electrical power from a source thereof, and is coupled to the electrical connector 58 via a charging lead 70. Also disposed within the base housing 48 is a data storage device, such as a hard disk drive 72, which is coupled to the electrical connector 58, as schematically depicted in FIG. 4, via a data transfer lead 74.

With the PDA 10 in its closed configuration and the PDA connector 40 facing the open outer bay end 50a, the PDA 10 may be inserted into the bay housing 54, as indicated by the arrow 76 in FIG. 1, to removably mate the PDA and bay electrical connectors 40 and 58 as shown in FIG. 4. A suitable ejection structure 78 of conventional construction is provided for uncoupling the inserted PDA 10 from the bay structure 50 and forcing the uncoupled PDA partly out of the open bay end 50a. As the PDA 10 is being inserted into the bay structure 50, the ESD pads 46 on the PDA 10 engage the corresponding ESD pads 62 within the bay housing 54 to discharge static electricity from the PDA to the chassis portion 64 (via the EMI shielding material 60 and the grounding structures 60a,64a) prior to the coupling of the PDA and bay connectors 40 and 58.

The coupling of the PDA and bay structure electrical connectors 40 and 58 automatically couples the electrical charging circuit 68 to the battery holding structure 36, and thus the battery 34. During operation of the host computer device 12 the circuitry 68 permits an electrical trickle charge to be passed to the battery 34, and when the host computer device 12 is not being operated the circuitry 68 permits a full charging current to be passed to the battery 34. The coupling of the PDA and bay structure electrical connectors 40 and 58 also couples the host computer device data storage device 72 with the data storage memory area 42 in the PDA to allow data transfer therebetween.

The provision of the specially designed bay structure 50 within the host computer device 12, and the placement of the ESD pads 46 on the PDA 10 conveniently allows the host computer device 12 to charge the inserted PDA 10, and provides for data transfer between the inserted PDA 10 to the host computer device 12 without the previous necessity of using an external stand for the PDA together with a data transfer cable and an electrical charging cable. Accordingly, the PDA user no longer needs to carry these bulky items around with the attendant possibility of losing them and thus preventing PDA charging and data transfer.

As can be seen, the bay structure 50 just described may be termed a dedicated PDA bay structure which is designed to accept only the indicated PDA 10. An alternate embodiment of the invention is shown in FIG. 4A and utilizes a modified bay structure 80 to accommodate the PDA 10 within the host computer device 12.

Figure 4A:
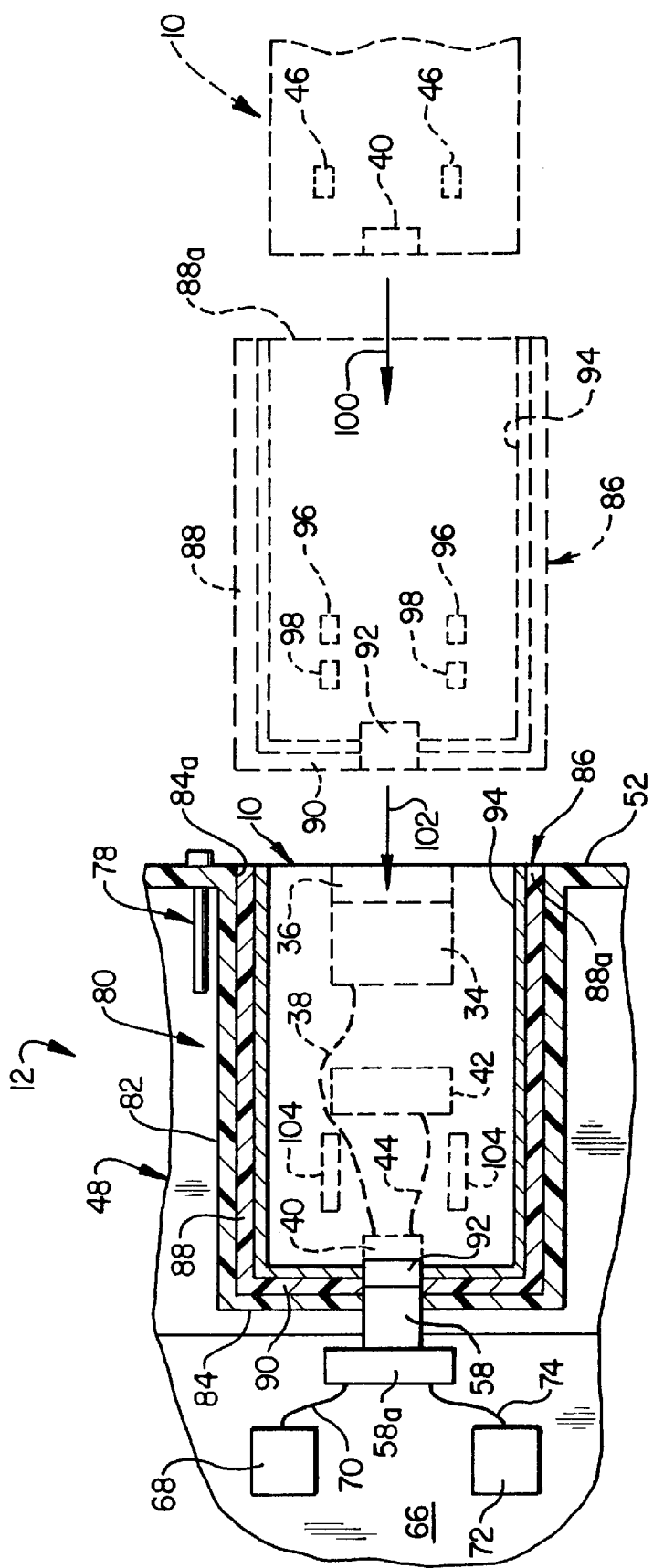
FIG. 4A is a view similar to that in FIG. 4, but illustrating an alternate embodiment of the bay structure and also showing, in phantom, the PDA and a portion of the bay structure removed from the host computer device.

Referring now to FIG. 4A, the modified bay structure 80 includes a rectangularly cross-sectioned plastic bay housing 82 extending inwardly through the computer base housing wall 52 and having a rear wall 84 through which the connector 58 inwardly projects, and an open outer end 84a. Modified bay structure 80 also includes a multibay adapter 86 which may be inserted into the bay housing 82 and into which the PDA 10 may be inserted. Multibay adapter 86 is externally configured to be complementarily received within the bay housing 82, and has an internal configuration which permits it to complementarily receive the PDA 10 which may have a cross-sectional configuration that is different from that of the bay housing 82.

Still referring to FIG. 4A, the multibay adapter 86 is shown in a solid line position in which it is operatively inserted into the plastic bay housing 82 with the PDA 10 operatively inserted into the multibay adapter 86, and in a dotted line position in which the multibay adapter 86 has been removed from the bay housing 82 and the PDA 10 has been removed from the multibay adapter 86. Multibay adapter 86 includes a hollow rectangular plastic housing 88 having an open front end 88a, and a rear wall 90 through which an electrical connector 92 extends, the connector 92 being mateable with the PDA connector 40 and the host computer device connector 58. The interior of the adapter housing 88 is lined with a metallic EMI shielding material 94 having a bottom side with a spaced pair of upwardly projecting ESD pads 96 thereon, and a top side with a spaced pair of ESD pads 98 thereon which project upwardly through the top side wall of the bay housing 82.

As the PDA 10 is inserted into the open end 88a of the multibay adapter 86, as indicated by the arrow 102 in FIG. 4A, the ESD pads 46 on the bottom side of the PDA 10 engage and slide rearwardly across the bottom PDA pads 96 within the multibay adapter 86, to discharge static electricity from the PDA, prior to the PDA connector 40 being mated with the multibay adapter connector 92. When the multibay adapter 86 is then inserted into the computer host device bay housing 82, as indicated by the arrow 102 in FIG. 4A, the upper multibay adapter ESD pads 98 engage and slide across a spaced pair of metallic grounding structures 104 prior to the mating of the multibay adapter connector 92 with the host computer device connector 58. The grounding structures 104 extend downwardly through the top side wall of the plastic bay housing 82 and are grounded to the chassis portion 64 (see FIG. 2).

As can be seen in the left side portion of FIG. 4, when the multibay adapter 86 is inserted into the bay housing 82, the host computer device electrical charging circuitry 68 and the data storage device 72 are respectively coupled to the PDA battery 34 and memory area 42 to effect battery recharging and data transfer between the memory area 42 and the data storage device 72 as previously described herein in conjunction with the dedicated PDA bay structure 50.

The foregoing detailed description is to be clearly understood as being given by way of illustration and example only, the spirit and scope of the present invention being limited solely by the appended claims.

What is claimed is:

1. Computer apparatus comprising:
   a personal digital assistant device having an internal memory area for receiving data, and a first electrical connector coupled to said memory area;
   a host computer device having disposed therein a data storage device and a second electrical connector coupled to said data storage device; and
   a bay structure operative to facilitate insertion of said personal digital assistant device into said host computer device in a manner removably mating said first and second electrical connectors to operatively couple said memory area to said data storage device to permit data transfer between said memory area and said data storage device, said bay structure including:
   a bay housing disposed in said host computer device and having an open outer end, and an inner end supporting said second electrical connector, and
   a multibay adapter removably insertable into said bay housing and having a third electrical connector structure mateable with said first and second electrical connectors, said multibay adapter having a housing portion into which said personal digital assistant device may be inserted to mate said first electrical connector with said third electrical connector structure, said housing portion of said multibay adapter having an interior surface covered with an EMI shielding material.

2. The computer apparatus of claim 1 further comprising cooperating electrostatic discharge structures disposed on said EMI shielding material and said personal digital assistant device and being engageable, during insertion of said personal digital assistant device into said housing portion of said multibay adapter, prior to the mating of said first electrical connector with said third electrical connector structure.

3. Computer apparatus comprising:
   a personal digital assistant device having an internal memory area for receiving data, a structure for holding a rechargeable storage battery, and a first electrical connector coupled to said memory area and said battery holding structure;
   a host computer device having disposed therein a data storage device, battery charging circuitry, and a second electrical connector coupled to said data storage device and said battery charging circuitry; and
   a bay structure operative to facilitate insertion of said personal digital assistant device into said host computer device in a manner removably mating said first and second electrical connectors to operatively couple said battery charging circuitry to a storage battery carried by said holding structure, and to permit data transfer between said memory area and said data storage device, said bay structure including:
   a bay housing disposed in said host computer device and having an open outer end, and an inner end supporting said second electrical connector, and
   a multibay adapter removably insertable into said bay housing and having a third electrical connector structure mateable with said first and second electrical connectors, said multibay adapter having a housing portion into which said personal digital assistant device may be inserted to mate said first electrical connector with said third electrical connector structure, said housing portion of said multibay adapter having an interior surface covered with an EMI shielding material.

4. The computer apparatus of claim 3 further comprising cooperating electrostatic discharge structures disposed on said EMI shielding material and said personal digital assistant device and being engageable, during insertion of said personal digital assistant device into said housing portion of said multibay adapter, prior to the mating of said first electrical connector with said third electrical connector structure.

5. Computer apparatus comprising:
- a host computer device having disposed therein a data storage device and an electrical connector coupled to said data storage device; and
- a bay structure operative to facilitate insertion of a personal digital assistant device into said host computer device in a manner removably mating said electrical connector with an electrical connector on the personal digital assistant device to thereby operatively couple said data storage device with a memory area in the personal digital assistant device in a manner permitting data transfer between said data storage device and the memory area in the personal digital assistant device, said bay structure including:
  - a bay housing disposed in said host computer device and having an open outer end, and an inner end supporting said host computer device electrical connector, and
  - a multibay adapter removably insertable into said bay housing and having an electrical connector structure mateable with the electrical connectors of said host computer device and the personal digital assistant device, said multibay adapter having a housing portion into which the personal digital assistant device may be inserted to mate the personal digital assistant device electrical connector with the multibay adapter electrical connector structure, said housing portion of said multibay adapter having an interior surface covered with an EMI shielding material.

* * * * *